US007911965B2

(12) United States Patent
Bergstrom et al.

(10) Patent No.: US 7,911,965 B2
(45) Date of Patent: Mar. 22, 2011

(54) METHOD AND ARRANGEMENT FOR A SYNCHRONIZED HSDPA RECONFIGURATION

(75) Inventors: Joakim Bergstrom, Stockholm (SE); Jacques Sagné, Paris (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 11/575,746

(22) PCT Filed: Sep. 23, 2005

(86) PCT No.: PCT/SE2005/001412
§ 371 (c)(1),
(2), (4) Date: Sep. 9, 2008

(87) PCT Pub. No.: WO2006/033636
PCT Pub. Date: Mar. 30, 2006

(65) Prior Publication Data
US 2010/0135220 A1 Jun. 3, 2010

(30) Foreign Application Priority Data
Sep. 23, 2004 (SE) ...................... 0402321

(51) Int. Cl.
*G01R 31/08* (2006.01)
*H04W 4/00* (2009.01)
*H04W 24/00* (2009.01)
*H04B 7/216* (2006.01)
*H04B 7/00* (2006.01)
*H04B 1/38* (2006.01)

(52) U.S. Cl. ........ 370/252; 370/329; 370/332; 370/335; 455/423; 455/503; 455/560

(58) Field of Classification Search ............... 370/252, 370/329–335, 389; 455/423–426, 503, 560
See application file for complete search history.

(56) References Cited

U.S. PATENT DOCUMENTS

| 7,299,065 B2 * | 11/2007 | Choi et al. ............. 455/525 |
| 7,502,597 B2 * | 3/2009 | Murata et al. ............. 455/95 |
| 2003/0002472 A1 * | 1/2003 | Choi et al. ............. 370/347 |
| 2003/0003919 A1 * | 1/2003 | Beming et al. ............. 455/446 |
| 2003/0035403 A1 | 2/2003 | Choi |
| 2004/0116139 A1 * | 6/2004 | Yi et al. ............. 455/503 |
| 2004/0121806 A1 * | 6/2004 | Hashimoto ............. 455/560 |
| 2005/0094656 A1 * | 5/2005 | Rao et al. ............. 370/431 |

(Continued)

FOREIGN PATENT DOCUMENTS
WO   WO 03/058988 A1   7/2003

OTHER PUBLICATIONS

3GPP TS 25.423 V5.10.0 (Jun. 2004) 3rd Generation Partnership Project; Technical Specification Group Radio Access Network; UTRAN Iur interface RNSAP signalling (Release 5).

(Continued)

*Primary Examiner* — Huy D Vu
*Assistant Examiner* — Brandon Renner

(57) ABSTRACT

The HSDPA (High Speed Downlink Packet Access)-related reconfigurations are synchronized between a UTRAN (UMTS Terrestrial Radio Access Network) and a mobile terminal (UE), by the Node B and the RNCs (Radio Network Controllers) providing the mobile terminal with a specific reconfiguration switching time. The reconfiguration switching time is either associated with the SFN (System Frame Number) or with the CFN (Connection Frame Number).

14 Claims, 9 Drawing Sheets

U.S. PATENT DOCUMENTS

2006/0039296 A1* 2/2006 Nakamata et al. ............ 370/252
2006/0198340 A1* 9/2006 Murata et al. ................ 370/331

OTHER PUBLICATIONS

3GPP TS 25.433 V5.9.0 (Jun. 2004) 3rd Generation Partnership Project; Technical Specification Group Radio Access Network; UTRAN Iub interface NBAP signalling (Release 5).

3GPP TS 25.331 V5.9.0 (Jun. 2004) 3rd Generation Partnership Project; Technical Specification Group Radio Access Network; Radio Resource Control (RRC); Protocol Specification (Release 5).

* cited by examiner

METHOD AND ARRANGEMENT FOR A SYNCHRONIZED HSDPA RECONFIGURATION

FIELD OF THE INVENTION

The present invention relates to the synchronization of HSDPA (High Speed Downlink Packet Access)-channel reconfigurations between a mobile terminal and a UTRAN (UMTS Terrestrial Radio Access Network).

BACKGROUND OF THE INVENTION

The 3GPP (Third Generation Partnership Project)-standard relates to technology based on radio access networks, such as the UTRAN, which is a radio access network architecture providing W-CDMA (Wideband Coding Division Multiple Access) to mobile terminals. Telecommunication systems according to the 3GPP-standard offer high and variable bit-rates and are capable of providing new types of services to the users, involving real-time audio and video, still images and text, e.g. news, sport results and weather forecasts. By means of the High Speed Downlink Packet Access (HSDPA)-feature of the 3GPP-standard, the system capacity and the peak data rates is increased in the downlink direction, and the transfer delays are reduced.

In a telecommunication system according to the 3GPP-standard, a mobile terminal, such as e.g. a cellular telephone provided with a SIM (Subscriber Identity Module)-card, is commonly referred to as a UE (User Equipment), and communicates with a core network connected to external networks, e.g. the Internet and the PSTN (the Public Switched Telephone Network), via a UTRAN covering a geographical area divided into cells with unique identities. Each cell is served by a base station device, which in the 3GPP is referred to as a Node B, and the radio coverage of a cell is provided by a base transceiver station (BTS) at the serving base station (i.e. Node B) site over an air-interface. One Node B normally serves more than one cell, and the Node Bs are controlled by a radio resource server, which is managing the transmission resources of the UTRAN and is connected to one or more core networks. The radio resource server is commonly referred to as an RNC (Radio Network Controller) in the present 3GPP-standard, and comprises a cell controlling entity, which owns the cell resource and handles the signalling toward the Node B, and a UE controlling entity for handling the signalling toward the UE. Conventionally, the cell controlling entity is referred to as a Controlling RNC, C-RNC, and the UE controlling entity is referred to as a Serving RNC, S-RNC.

FIG. 1 illustrates an exemplary, conventional radio access network architecture, providing W-CDMA to UEs, of which only one UE is shown in this figure. The UE 1 is located in a cell, 2, which is served by Node B, 3, and the Node B and the UE communicates over an air-interface, i.e. a Uu-interface. The Node B is controlled by a cell controlling entity 4, i.e. a C-RNC, and the individual UE is controlled by a UE controlling entity, 5, i.e. a S-RNC, the cell controlling entity and the UE controlling entity forming a radio resource server, 6, i.e. radio network controller, RNC.

A cell controlling entity 4 of a radio resource server 6, e.g. a C-RNC, controls the signalling towards several Node Bs, and the Node B forwards the signals over an air interface to the UEs located in the cells served by the Node B. A UE controlling entity 5 of a radio resource server, e.g. an S-RNC, controls the signalling towards individual UEs by means of stored context information, and normally remains S-RNC while a UE is connected to the RAN, also when the UE moves over a large geographical area and passes through several cells, until the UE is disconnected. Alternatively, a change of S-RNC is performed with a S-RNC relocation procedure. Due to cell the relocation of a UE, the cell controlling entity may not be located in the same radio resource server as the UE controlling entity. Alternatively, the cell controlling entity may be physically located in connection with base station device.

Regarding the radio resource control (RRC), the UE operates either in an Idle Mode or in a Connected Mode, and the UE automatically enters the Idle Mode at power on, before a connection is established between the UE and a UTRAN. When a connection is established, the UE enters a Connected Mode, and is assigned a U-RNTI (a UTRAN Radio Network Temporary Identity), which can be used in any cell of UTRAN. Within the Connected Mode, there are four different states, i.e. the CELL_DCH (Dedicated Channel) state, the CELL_FACH (Forward Access Channel) state, the CELL_PCH (Paging Channel) state and the URA_PCH state. However, to be capable of HDSPA reception, a UE must be in the connected CELL_DCH state, in which a dedicated physical channel is allocated to the UE for the uplink and downlink, while a combination of dedicated and shared transport channels are available to the UE.

In W-CDMA, the information data is CDMA coded before the transmission, and the same frequency can be used simultaneously by all UEs. The CDMA coding involves a first step of spreading (channelization) for establishing a fixed pre-defined bit-rate, by replacing each information data bit by a spreading code (channelization code). The spreading factor (SF) indicates the length of the code, being between 4 and 256 bits in uplink and between 4 and 512 bits in downlink. A second step of the CDMA coding involves scrambling, in which the spread information data is coded with a unique scrambling code.

In order to support the HSDPA, the W-CDMA is extended by a new downlink transport channel, the HS-DSCH (High Speed Downlink Shared Channel), and the HS-DSCH is mapped onto one or several HS-PDSCH (High Speed Physical Downlink Shared Channels), received simultaneously by the UE. Thereby, the HS-DSCH provides an enhanced support in the downlink direction for UEs in the connected CELL_DCH state, facilitating interactive, background, and streaming radio access bearer services, and allows a higher-order modulation and a faster link adaptation than earlier transport channels. Furthermore, the Node B is provided with a new MAC sub-layer, MAC-hs (Medium Access Control High Speed, for the HS-DSCH transmission, and the MAC-hs supports fast hybrid ARQ (Automatic Repeat Request) with soft combining, increasing the system capacity as well as substantially reducing the delays. The HS-DSCH transmission uses a common spreading (channelization) code resource, with is shared dynamically by several UEs in the time domain and code domain, but primarily in the time domain. The shared code resource consists of up to 15 channelization codes having a fixed spreading factor, SF 16. Dynamic allocation of channelization codes from the shared code resource is performed with an interval of 2 ms, which also corresponds to the duration of the HS-DSCH Transmission Time Interval (TTI).

A DPCH (Dedicated Physical Channel) transmits data between a Node B and a UE served by the Node B, and the DL-DPCH (Down Link Dedicated Physical Channel) provides a down-link for transmitting signals or data from the Node B to UE, while the UP-DPCH (Up Link Dedicated Physical Channel) provides the up-link for transmitting the signals or data from the UE to the Node B. The physical channels transfer data during frames, corresponding to predefined time intervals. An SFN (System Frame Number) can be used in synchronization procedures, and the SFN is broadcast on a P-CCPCH (Primary Common Control Physical Channel). The SFN has a duration of 10 ms, a range of 0-4095, and increments with each received frame. A CFN (Connection Frame Number) can also be used in a synchronization procedure with respect to a particular UE, and the CFN and is related to the SFN. The CFN has a range of 0-255, incremented with each received frame.

In the downlink, the HS-DSCH employs separate physical Shared Control Channels (HS-SCCH) to convey the fast signalling information required for support of the link adaptation, hybrid ARQ (Automatic Repeat Request) and resource allocating functions. The HS-SCCH uses a fixed spreading factor, SF 128, and has a time structure based on a sub-frame having a length of 2 ms. The timing of the HS-SCCH is synchronized with the P-CCPCH, on which the SFN of the cell is transmitted, which means that every 10 ms the start of the HS-SCCH sub-frame is aligned with the start of the P-CCPCH frame. Regarding the HS-PDSCH sub-frame, the HS-SCCH sub-frame starts two time slots prior to the start of the HS-PDSCH sub-frame.

In the uplink, the HS-DSCH introduces a separate physical channel, the Dedicated Physical Control Channel (HS-DPCCH), for providing feedback hybrid ARQ information as well as channel quality information (CQI), and the HS-DPCCH is code multiplexed with the DSCH. Similarly to the HS-PDSCH and HS-SCCH, the HS-DPCCH uses a 2 ms sub-frame structure, with a timing defined in relation to the HS-PDSCH, such that the feedback hybrid ARQ information regarding an HS-PDSCH sub-frame is sent approximately 19200 chips (rounded to the closest 256 chip boundary of the UL-DPCH) after the end of the HS-PDSCH sub-frame.

The transport channels, the physical channels and the radio bearers are configured and reconfigured by means of reconfiguration procedures defined in the 3GPP standard, in which the UTRAN, i.e. the Node B, performs up-link synchronization procedures, and the UE performs down-link synchronization procedure.

Conventionally, a reconfiguration procedure is initiated by a cell controlling entity of the radio resource server, i.e. the C-RNC, sending a reconfiguration requesting message to the Node B. The Node B sends a radio link updating message to the UE controlling entity of a radio resource server, i.e. the S-RNC, which sends an RRC reconfiguration message to a UE and a RNSAP/NBAP reconfiguration message to the Node B handling the UE, the RNSAP/NBAP/RRC reconfiguration message comprising configuration parameters, as well as an indication of the activation time of the reconfiguration, by including an activation time IE. The start of the synchronization procedures is controlled by the activation time IE, pointing to a specific CFN.

However, the existing solution according to prior art involves a number of drawbacks. For example, according to a present 3GPP standard UTRAN Iub interface NBAP (Node B Application Part) signalling protocol, the C-RNC sends a PHYSICAL SHARED CHANNEL RECONFIGURATION REQUEST-message as a reconfiguration request to a Node B, to be used to configure or reconfigure HS-DSCH related resources in a cell. The HS-DSCH (High Speed Downlink Shared Channel) is a new HSDPA-related downlink transport channel, and the parameters that can be set by this message, in an FDD (Frequency Division Duplex)-mode, include the following:

HS-PDSCH and HS-SCCH Total Power, which sets the maximum transmission power allowed to be used for HS-PDSCH and HS-SCCH transmission,
HS-PDSCH and HS-SCCH Scrambling Code,
HS-PDSCH FDD Code Information, indicates the channelization codes reserved for HS-PDSCH transmission,
HS-SCCH FDD Code Information, indicates the channelization codes allocated for HS-SCCH transmission.

In order to allow a synchronized change of the configurations used in the downlink, said PHYSICAL SHARED CHANNEL RECONFIGURATION REQUEST-message, issued by the C-RNC, is further provided with an SFN IE (System Frame Number Information Element), enabling the Node B to activate the new configuration at the head boundary of that specified SFN. The synchronized reconfiguration at a given SFN will minimize the data loss and throughput degradation caused by a mismatch in the channelization or scrambling codes between UTRAN and a UE. Upon receipt of a PHYSICAL SHARED CHANNEL RECONFIGURATION REQUEST-message, according to a present 3GPP-standard, from the C-RNC, including the SFN IE, the Node B performs a reconfiguration of the downlink parameters by switching to the new configuration at the indicated SFN. In case this reconfiguration has an effect on the downlink configuration set up towards the UE regarding the HS-DSCH (High Speed Downlink Shared Channel), the Node B shall notify the S-RNC of the change of the downlink parameters by issuing a RADIO LINK PARAMETER UPDATE INDICATION-message towards the C-RNC, to be further relayed to the S-RNC, in case the C-RNC and the S-RNC are located in different nodes. In case the C-RNC and the S-RNC are located in the same node, this message will be forwarded as a node internal message. Upon receipt of this RADIO LINK PARAMETER UPDATE INDICATION-message, the S-RNC initiates reconfiguration procedures towards the Node B and the UE, in order to change the downlink and uplink HS-DSCH configuration applicable to the UE.

The reconfiguration procedure performed from the S-RNC towards the Node B uses a NBAP/RNSAP RADIO LINK RECONFIGURATION-message, which according to present 3GPP-standard 3GPP TS 25.423 and 25.433 may comprise the following:
RADIO LINK RECONFIGURATION PREPARE
RADIO LINK RECONFIGURATION READY
RADIO LINK RECONFIGURATION COMMIT
RADIO LINK RECONFIGURATION FAILURE
RADIO LINK RECONFIGURATION CANCEL
RADIO LINK RECONFIGURATION REQUEST
RADIO LINK RECONFIGURATION RESPONS The above-described NBAP/RNSAP RADIO LINK RECONFIGURATION-message performs for instance:
Configuration of CQI on the HS-DPCCH
Configuration of power offsets for different information on the HS-DPCCH The reconfiguration procedure performed from S-RNC towards the UE is performed with RRC RB reconfiguration messages, which according to present 3GPP-standard 3GPP TS 25.331 may comprise the following:
RADIO BEARER SETUP
RADIO BEARER RECONFIGURATION
RADIO BEARER RELEASE
TRANSPORT CHANNEL RECONFIGURATION
PHYSICAL CHANNEL RECONFIGURATION However, since the reconfiguration of the Node B, ordered by the C-RNC, is not perfectly synchronized with the reconfiguration of UE, ordered by the S-RNC, the HSDPA performance may degrade due to the resulting configuration mismatch between the UTRAN and the UE. The problem with achieving a synchronized reconfiguration of downlink HSDPA-related parameters is caused by the difficulty to set up a new HS-DSCH configuration at a specific SFN regarding a UE in the CELL_DCH state. This is due to the RADIO LINK PARAMETER UPDATE INDICATION-message, issued by the Node B, not including any information element informing the S-RNC of the exact point in time when the new downlink configuration shall be taken into use, i.e. switching time, since the conventional Dedicated NBAP/RNSAP/RRC reconfiguration messages, related to a specific UE, only allows reconfigurations at a given CFN (Connection Frame Number), and not at a given SFN. Furthermore, a UE in the CELL_DCH state does not keep track of the SFN value, only of the P-CCPCH timing.

Therefore, the aim of the present invention is to solve the problems described above in order to provide synchronized HSDPA-related reconfigurations between the UTRAN and a UE.

DESCRIPTION OF THE INVENTION

Thus, it is an object of the present invention to synchronize downlink HSDPA-related reconfiguration with a given SFN.

This and other objects are achieved by two corresponding methods in a Node B and, and by two corresponding Node B:s, according to the attached claims.

The claims relate to a method in a radio base station, e.g. a Node B, of performing a synchronized HSDPA (High Speed Downlink Packet Access)-related reconfiguration in a UTRAN (UMTS Terrestrial Radio Access Network) comprising the steps of
  receiving a reconfiguration requesting message from a cell controlling entity of a radio resource server, the message comprising an SFN (System Frame Number) IE indicating a configuration switching time,
  sending a Radio Link updating message to a UE controlling entity of a radio resource server, the message comprising said SFN IE;
  receiving an NBAP/RNSAP reconfiguration message from the UE controlling entity;
  deriving said SFN IE from said NBAP/RNSAP reconfiguration message;
  forwarding an RRC reconfiguration message from the UE controlling entity to the UE, the SFN IE copied into said RRC reconfiguration message from the Radio Link updating message by said UE controlling entity, said SFN IE enabling the UE to read the SFN broadcast on a P-CCPCH (Primary Common Control Physical Channel) and switch to the new configuration at the point of time indicated by the SFN;
  switching to new configuration at the point of time indicated by the SFN IE.

The claims also relate to a corresponding method in said radio base station for performing a synchronized HSDPA-related reconfiguration in a UTRAN comprising the steps of
  receiving a reconfiguration requesting message from a cell controlling entity of a radio resource server, the message comprising an SFN (System Frame Number) IE indicating a configuration switching time;
  performing a conversion of the SFN (System Frame Number) to a CFN (Connection Frame Number).
  sending a Radio Link updating message to the UE controlling entity of a radio resource server cell, the message comprising a first activation time IE indicating said CFN, said first activation time being a CFN IE.

receiving an NBAP/RNSAP reconfiguration message from the UE controlling entity;
  deriving the SFN IE from said NBAP/RNSAP reconfiguration message;
  forwarding an RRC reconfiguration message to the UE, the message received from said UE controlling entity and comprising a second activation time IE, enabling the UE to switch to a new configuration at the point of time indicated by CFN.
  switching to a new configuration at the point of time indicated by the SFN IE;

The second activation time IE, enabling the UE to perform the reconfiguration at the point of time indicated by CFN, may correspond to a CFN IE, or to a Downlink HSDPA IE, providing an improved synchronization, and the Downlink HSDPA IE may indicate the head boundary of a P-CCPCH-frame.

The claims further relate to radio base stations, or Node Bs, in a UTRAN comprising units that are arranged to perform a synchronized HSDPA-related reconfiguration as described above.

The second activation time IE, enabling the UE to perform the reconfiguration at the point of time indicated by CFN, may correspond to a CFN IE or to a Downlink HSDPA IE, providing an improved synchronization, and the Downlink HSDPA IE may indicate the head boundary of a P-CCPCH-frame.

Further, the radio resource server may correspond to a radio network controller, RNC; the cell controlling entity may correspond to a controlling radio network controller, C-RNC; and the UE controlling entity may correspond to a serving radio network controller, S-RNC.

Other features and further advantages of the invention will be apparent from the following description and figures, as well as from the attached claims.

BRIEF DESCRIPTION OF THE DRAWINGS

The present invention will now be described in more detail and with reference to the embodiments and to the drawings, of which.

DESCRIPTION OF PREFERRED EMBODIMENTS

The terms and expressions used in the description and in the claims are meant to have the meaning normally used by a person skilled in the art, and the following abbreviations will be used:
3GPP: Third Generation Partnership Project
UMTS: Universal Mobile Telecommunications
UTRAN: UMTS Terrestrial Radio Access Network
UE: User Equipment
RNC: Radio Network Controller
CRNC: Controlling RNC
SRNC: Serving RNC
RRC: Radio Resource Control
ARQ: Automatic Repeat Request
CQI: Channel Quality Information
SFN: System Frame Number
CFN: Connection Frame Number
DPCH: Dedicated Physical Channel
HSDPA: High Speed Downlink Packet Access
HS-DSCH: High Speed Downlink Shared Channel
HS-PDSCH: High Speed Physical Downlink Shared Channel
HS-SCCH: High Speed Shared Control Channel
P-CCPCH: Primary Common Control Physical Channel
MAC: Medium Access Control
MAC-hs: Medium Access Control High Speed
NBAP: Node B Application Part
RNSAP: Radio Network Subsystem Application Part
TTI: Transmission Timing Interval The present invention provides downlink HSDPA-related reconfigurations synchronized with the SFN, by issuing a specific time reference to the UE. According to a first, exemplary embodiment of the invention, the time reference is associated with the SFN, and according to the second and third exemplary embodiments, the time reference is associated with the CFN (Connection Frame Number).

In the first embodiment of this invention, the mobile terminal (i.e. a UE) switches to the new configuration at a given SFN, thus enabling a perfectly synchronized switch between UTRAN and the UE. However, a UE in the CELL_DCH state is not capable of keeping track of the SFN, only of the P-CCPCH timing.

According to this first exemplary embodiment, the SFN (System Frame Number) is included as an optional IE in the RADIO LINK PARAMETER UPDATE INDICATION message, sent to the S-RNC from the Node B, and in the RRC reconfiguration message, sent to the UE from the S-RNC. Upon receipt of the SFN IE in an RRC reconfiguration message, a UE in the CELL_DCH state is capable of reading the SFN broadcast on the P-CCPCH and, thereafter, to switch to the new configuration at the received SFN.

More specifically, upon receipt of a PHYSICAL SHARED CHANNEL RECONFIGURATION REQUEST message from the C-RNC, requesting a downlink HSDPA reconfiguration at a given SFN, the Node B issues a RADIO LINK PARAMETER UPDATE INDICATION-message towards the S-RNC (relayed by the C-RNC, if necessary), including the SFN IE. When the S-RNC receives said RADIO LINK PARAMETER UPDATE INDICATION message, including the SFN IE, the S-RNC engages necessary reconfiguration procedure towards the Node B serving the UE, and includes the SFN IE into the RRC reconfiguration message issued towards the UE. Upon receipt of an RRC reconfiguration message including the SFN IE, the UE reads the SFN broadcast on P-CCPCH, and switches, thereafter, to the new configuration at the head boundary of the P-CCPCH frame indicating the received SFN.

Figure 1:
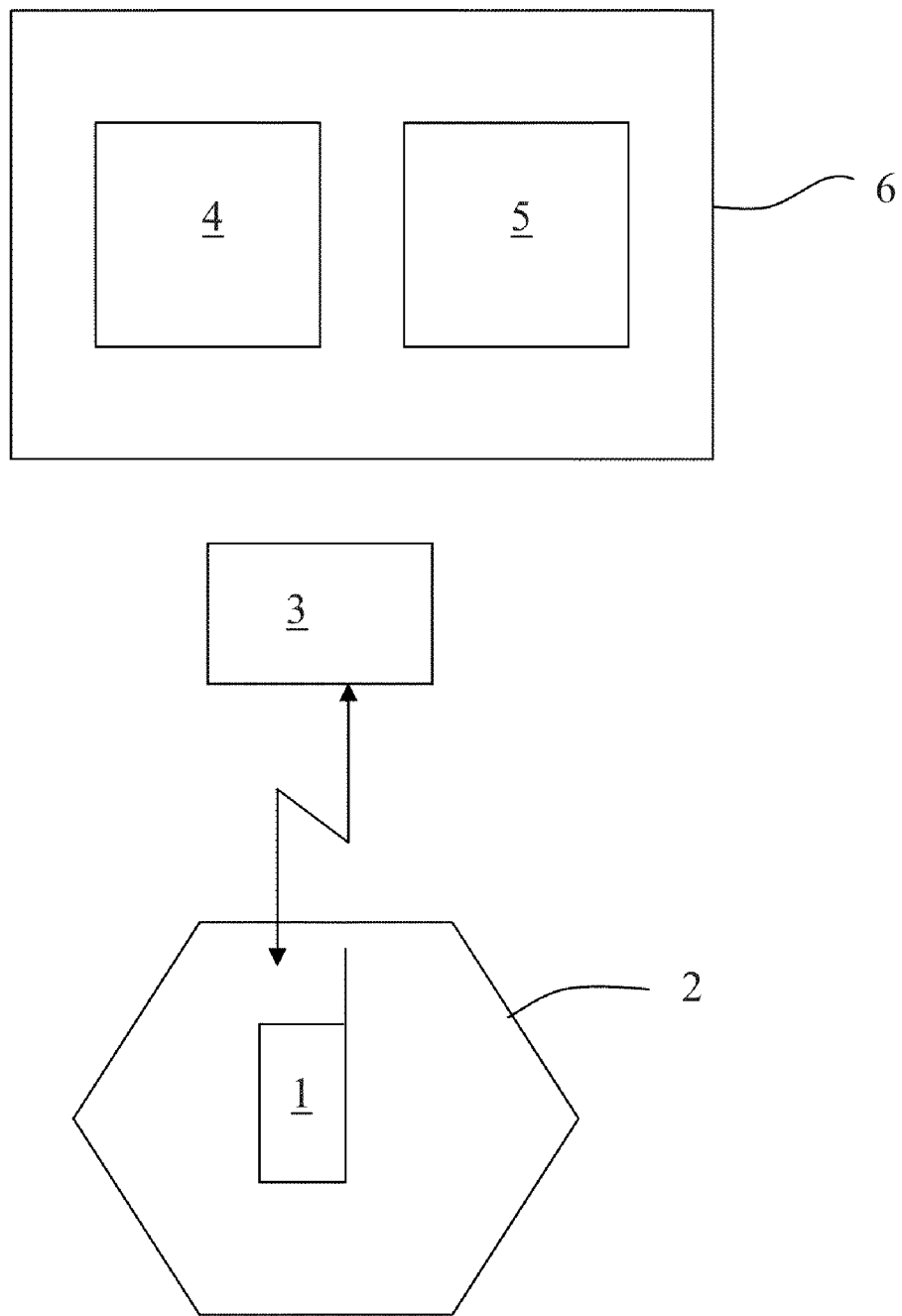
FIG. 1 illustrates a conventional UTRAN.
Figure 2:
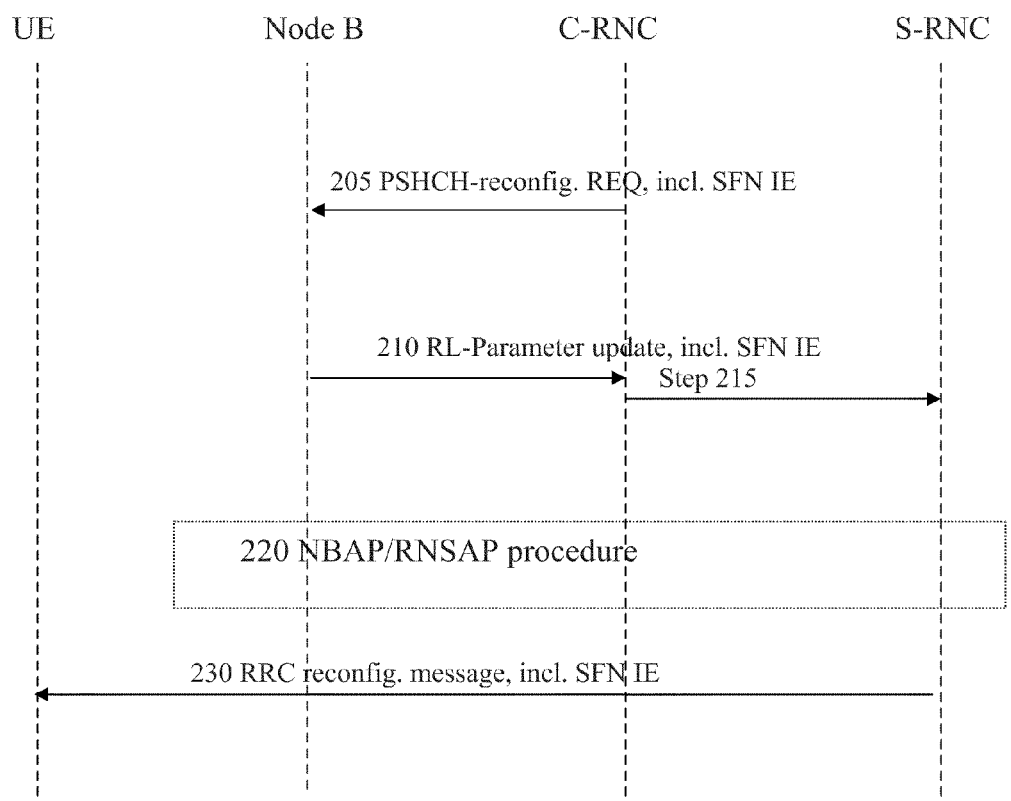
FIG. 2 shows a sequence chart illustrating the solution according to a first embodiment of the present invention.

FIG. 2 illustrates said first embodiment of the present invention. In step 205, the C-RNC sends a PHYSICAL SHARED CHANNEL RECONFIGURATION REQUEST (PSHCH reconfig.REQ) message, including an SFN IE, to the Node B, and in step 210, the Node B sends a RADIO LINK PARAMETER UPDATE INDICATION (RL-parameter update) message, including an SFN IE, to the C-RNC. In step 215, the C-RNC forwards the message to the S-RNC, in case the C-RNC and S-RNC are different nodes. Box 220 indicates an optional NBAP/RNSAP-reconfiguration procedure message from the S-RNC to the Node B, and in step 230, the S-RNC sends a RRC reconfiguration message, PHYSICAL CHANNEL RECONFIGURATION, including an SFN IE, to the UE, via Node B.

To avoid unnecessary complexity, any reconfiguration triggered by the reception of the RADIO LINK PARAMETER UPDATE INDICATION message in step 210 and 215, and engaged by the S-RNC towards the serving Node B, shall take place at the SFN indicated by the C-RNC in the PHYSICAL SHARED CHANNEL RECONFIGURATION REQUEST message, received by the Node B in step 205.

Figure 3A:
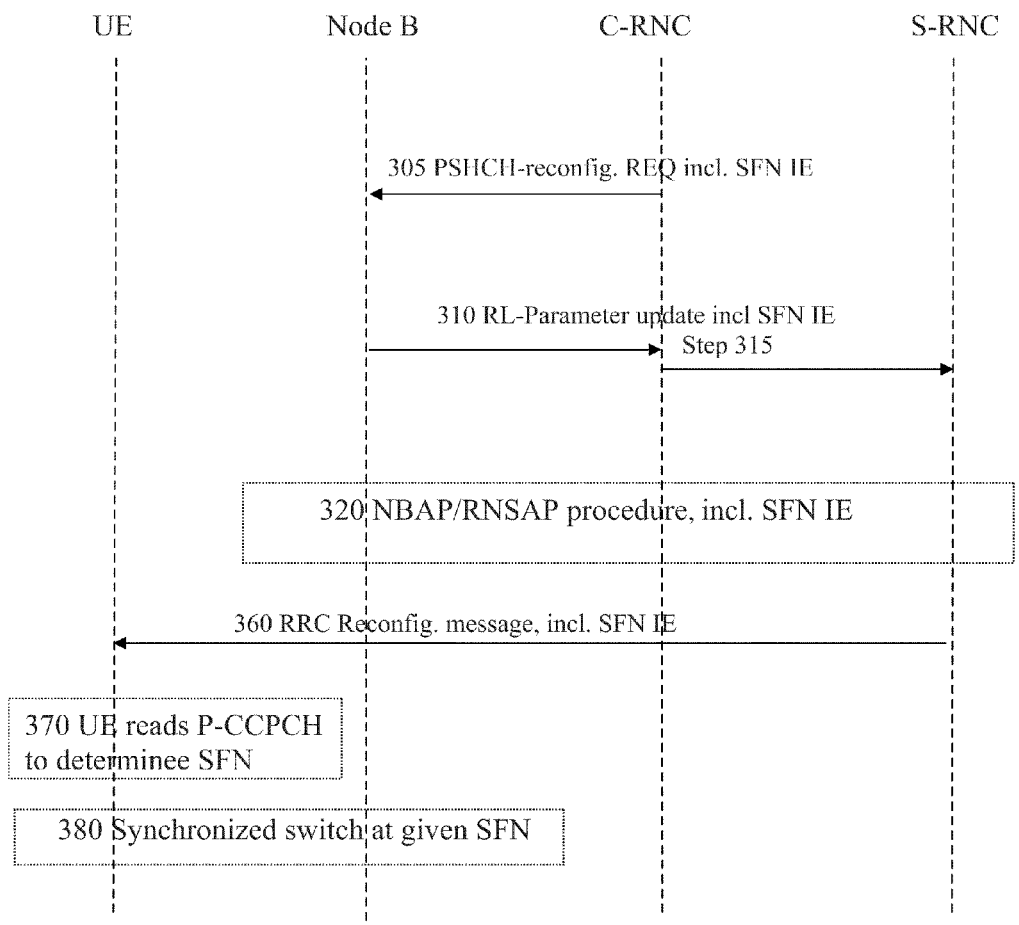
FIG. 3a shows a first alternative of the first embodiment of the present invention.

If a Node B would be capable of linking the NBAP/RNSAP reconfiguration message related to a specific UE and received from the S-RNC in step 220, to a previously RADIO LINK PARAMETER UPDATE INDICATION message sent to the C-RNC in step 210, the Node B would be able to autonomously derive the SFN where the new configuration shall be activated. However, since several procedures of the same type may be engaged in parallel, either by the Node B or the S-RNC, it is necessary to provide the Node B with unambiguous means to derive the SFN during which the switch shall occur. This may e.g. be implemented according to two alternative procedures:

A first alternative procedure of the first embodiment is illustrated in FIG. 3a, of which step 305, 310, 315, 320 and 360 corresponds to steps 205, 210, 215, 220 and 230, respectively, in FIG. 2, and are not described any further hereinafter. According to the first alternative procedure described in FIG. 3a, an explicit indication of switching time is performed, and the SFN IE, received by S-RNC in step 315, is copied by the S-RNC into an optional NBAP/RNSAP reconfiguration procedure message issued towards the serving Node B, indicated in box 320, (i.e. an explicit indication of switching time) and into the RRC reconfiguration message towards the UE in step 360. Upon receipt of a RRC reconfiguration message in step 360, including the SFN IE, the UE reads the P-CCPCH to determine the SFN, as indicated in box 370, and both the UE and the Node B switch to the new configuration at this given SFN, as indicated in box 380.

Figure 3B:
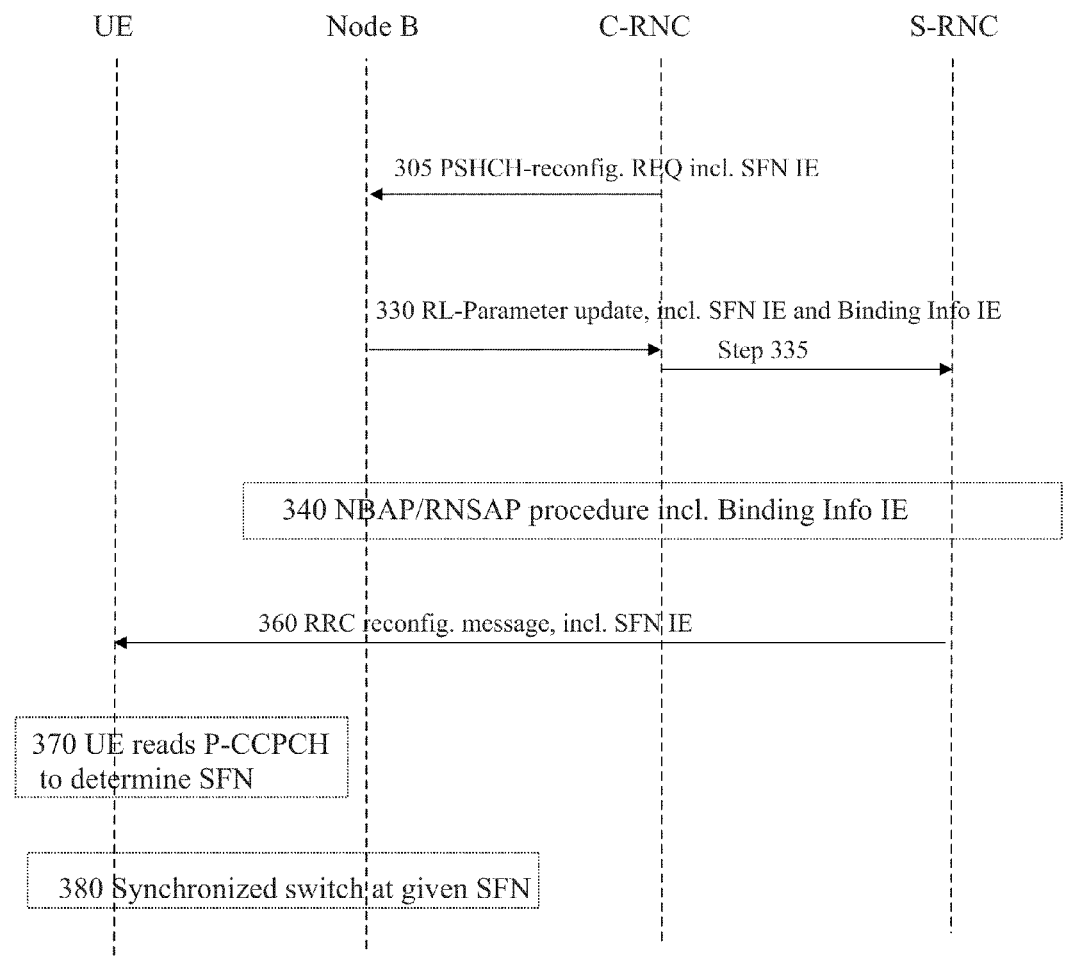
FIG. 3b shows a second alternative of the first embodiment of the present invention.

A second alternative procedure of the first embodiment is illustrated in FIG. 3b, of which the steps 305, 360 and the boxes 370 and 380 corresponds to the steps with the same reference numerals in FIG. 3a, and are not described any further hereinafter. However, in this alternative procedure, an implicit indication of switching time is performed, by a Binding Info IE included by the Node B in the RADIO LINK PARAMETER UPDATE INDICATION message in step 330 and 335. The Binding Info IE is, thereafter, copied by the S-RNC into the optional NBAP/RNSAP reconfiguration procedure message to the Node B, indicated in box 340. The Binding Info IE allows the Node B to link any reconfiguration request, in step 340, to a SFN IE previously included in a RADIO LINK PARAMETER UPDATE INDICATION message in step 330 (i.e. an implicit indication of switching time), and both the Node B and the UE is capable of switching to the new configuration at the given SFN, in box 380.

In the solution according to a second exemplary embodiment of this invention, the Node B determines the most optimal CFN for performing the switch in the UE, taking the received SFN as input. The determined CFN is thereafter notified to the UE, which shall apply the new configuration at the point of time derived from the activation time relating to the CFN for HSDPA reconfigurations. However, this solution may cause minor degradation in the HSDPA performance, due to a minor configuration mismatch between UTRAN and the UE.

Figure 4:
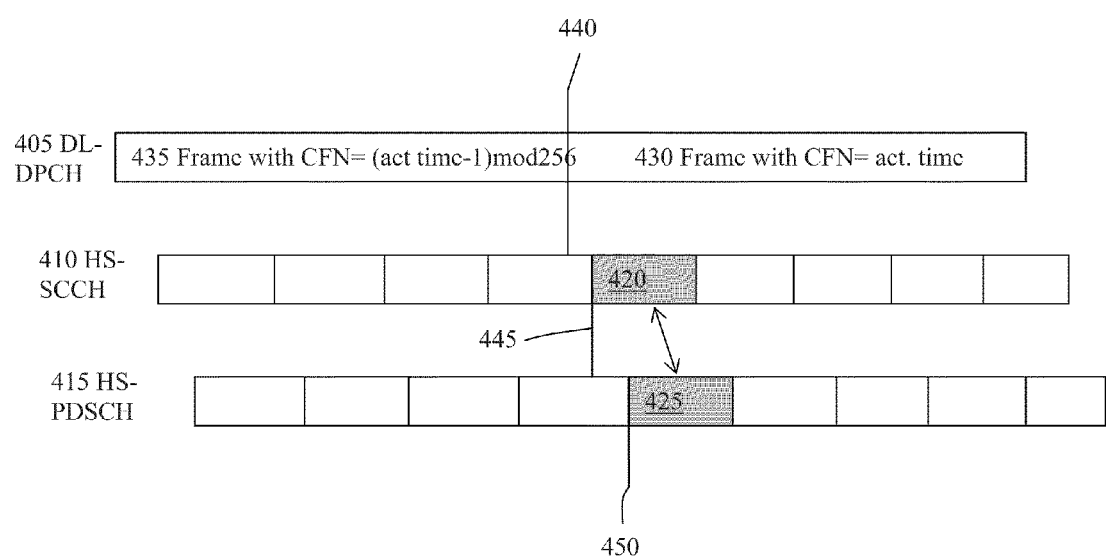
FIG. 4 illustrates a time diagram for synchronised reconfiguration according to the second embodiment of the present invention.

FIG. 4 illustrate channels DL-DPCH (Down Link Dedicated Physical Channel) 405, HS-SCCH (High Speed Shared Control Channel) 410 and HS-PDSCH (High Speed Physical Downlink Shared Channel) 415, and the marked frames 420 and 425 indicate the first sub-frames with the new parameters, after the reconfiguration of the HSDPA related channels. The DL-DPCH frame 430 is the 10 ms frame referred to by the activation time CFN received by the UE in a RRC reconfiguration message, and the frame 435 is the last DL-DPCH frame before the reconfiguration. The point of times indicated at 440, 445 and 450 are the point of time at which any synchronized reconfigurations, having an effect on the downlink HS-DSCH configuration, including the activation time IE pointing to a specific CFN, shall be activated.

Figure 5:
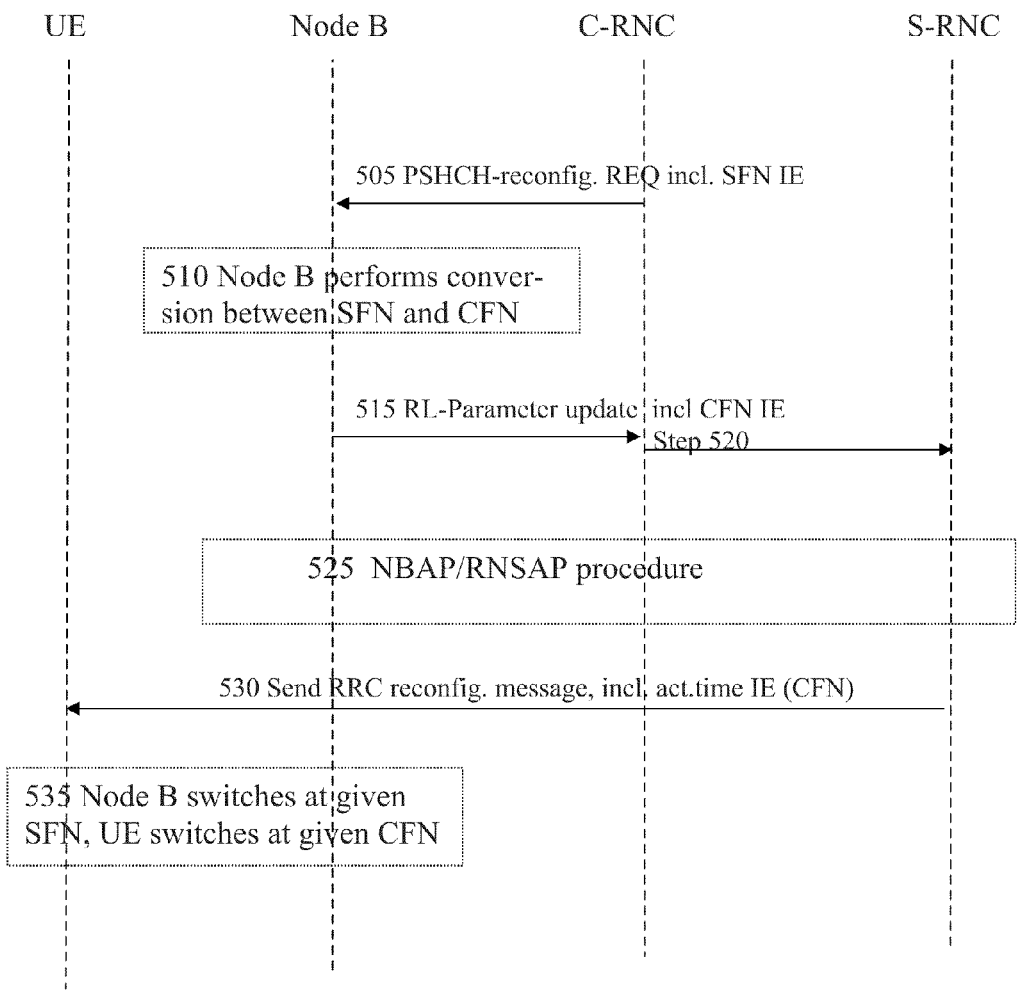
FIG. 5 shows a sequence chart illustrating the solution according to a second embodiment of the present invention.

FIG. 5 illustrates the second embodiment of this invention. In step 505, the C-RNC sends a PHYSICAL SHARED CHANNEL RECONFIGURATION REQUEST (PSHCH reconfig.REQ) message, including an SFN IE, to the Node B. As indicated in box 510, the Node B converts the received SFN to a CFN, by determining the CFN from the received SFN, minimizing any performance degradation due to configuration discrepancy between the UE and the Node B. In step 515, the Node B sends a RADIO LINK PARAMETER UPDATE INDICATION (RL-parameter update) message, including CFN IE, to the C-RNC, and in step 520, the C-RNC forwards the message to the S-RNC, in case the C-RNC and S-RNC are different nodes. Box 525 indicates an optional NBAP/RNSAP-reconfiguration procedure message sent to the Node B from the S-RNC, and in step 530, the S-RNC sends a RRC reconfiguration message, e.g. a PHYSICAL CHANNEL RECONFIGURATION, including an activation time IE pointing at the CFN, to the UE via the serving Node B. Thereafter, as indicated in Box 535, the Node B switches at a given SFN, and the UE switches at a given CFN.

Regarding the conversion performed by Node B in step 510, from the SFN to a suitable CFN for the reconfiguration to take place, the CFN is a multiple of the largest TTI present before or after activation time (or both). As the start of P-CCPCH, the frames may be aligned with any of the HS-SCCH sub-frames, and if a maximum TTI of 40 ms is assumed, any discrepancy between the Node B and the UE configuration can last up to approximately 20 ms. Obviously, any configuration mismatch will lead to performance degradation, as the UE may not be scheduled under that time. Since the Node B has knowledge of both the SFN and the CFN, the Node B is responsible for determining the CFN to be notified to the UE, as indicated in box 510 in FIG. 5, i.e. the CFN minimizing the period of time during which a configuration discrepancy will occur between the Node B and the UE, taking the SFN as input. The corresponding CFN is thereafter included in the RADIO LINK PARAMETER UPDATE INDICATION message issued towards the C-RNC, in step 515. Upon receipt of a RADIO LINK PARAMETER UPDATE INDICATION message including the CFN IE, the S-RNC copies the CFN IE into the activation time IE, to be included in the RRC reconfiguration message issued towards the UE, in step 530. Upon receipt of a RRC reconfiguration message, including the activation time IE, the UE activates the new configuration at the point of time defined by the activation time IE, as indicated in box 535. Whereas the CFN IE is used towards the UE, the Node B activates the new dedicated configuration (related to the UE), as indicated in box 535, at the SFN previously indicated by the C-RNC in step 505. Consequently, and similar to the solution of the first embodiment, it is possible for the Node B to determine the SFN, during which the switch to the new configuration shall take place either by the explicit indication of the switching time, as in the first alternative procedure of the first embodiment, described in connection to FIG. 3*a*, or by the implicit indication of switching time, as in the second alternative procedure of the first embodiment, described in connection to FIG. 3*b*. Furthermore, and as the SFN range is [0 . . . 4095], compared to a CFN cycle of [0 . . . 255], the RADIO LINK PARAMETER UPDATE INDICATION message is not issued by the Node B earlier than 255 frames before the point of time where the switch shall occur, i.e. the Node B may have to wait before issuing such message towards the S-RNC.

The solution according to the third, exemplary embodiment also mandates the Node B to perform a SFN to CFN conversion, but requires a new functionality in the UE for allowing a switch to a new downlink HSDPA configuration at the head boundary of a specified P-CCPCH frame, thereby eliminating any configuration mismatch between the UTRAN and a UE. More specifically, a new IE is defined, hereinafter referred to as a DL HSDPA activation time, or a downlink HSDPA activation time, to be included in RRC reconfiguration messages issued towards the UE. Similarly to the conventional activation time IE, the DL HSDPA activation time IE points to a particular CFN, and the UE derives the exact point of time when the new configuration is activated as follows: The UE selects the P-CCPCH frame which starts during the frame with the CFN value indicated by the DL HSDPA activation time IE, and starts using, at that HS-SCCH sub-frame boundary, the new downlink HS-DSCH configuration in the received message, replacing any old configuration.

Figure 6:
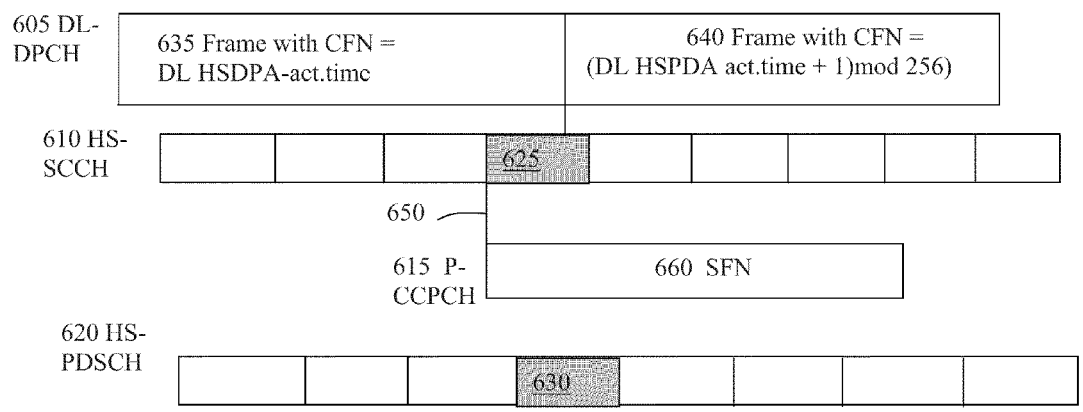
FIG. 6 illustrates a time diagram for a synchronised reconfiguration according to the third embodiment of the present invention.

FIG. 6 illustrates the channels DL-DPCH (Down Link Dedicated Physical Channel) 605, HS-SCCH (High Speed Shared Control Channel) 610, P-CCPCH (Primary Common Control Physical Channel) 615 and HS-PDSCH (High Speed Physical Downlink Shared Channel) 620, and the marked frames 625 and 630 indicate the first sub-frames with the new parameters, after the reconfiguration of HSDPA related channels. The DL-DPCH frame 635 is the 10 ms frame referred to by the new DL HSDPA activation time IE, received by the UE in an RRC reconfiguration message, and frame 640 is the DL-DPCH frame after the DL HSDPA activation time, where the new configuration is taken into use. The point of time indicated at 650 is the point of time at which any synchronized reconfigurations, having an effect on the downlink HS-DSCH configuration, including the new DL HSDPA activation time IE pointing to a specific CFN, shall be activated. This point of time is determined by the UE selecting the indicated SFN frame 660 in the P-CCPCH 620 by selecting the frame with the CFN value indicated by the DL HSDPA activation time IE, and start using, at that HS-SCCH sub-frame boundary, the new downlink HS-DSCH configuration included in the received reconfiguration message, replacing any old configuration.

Figure 7:
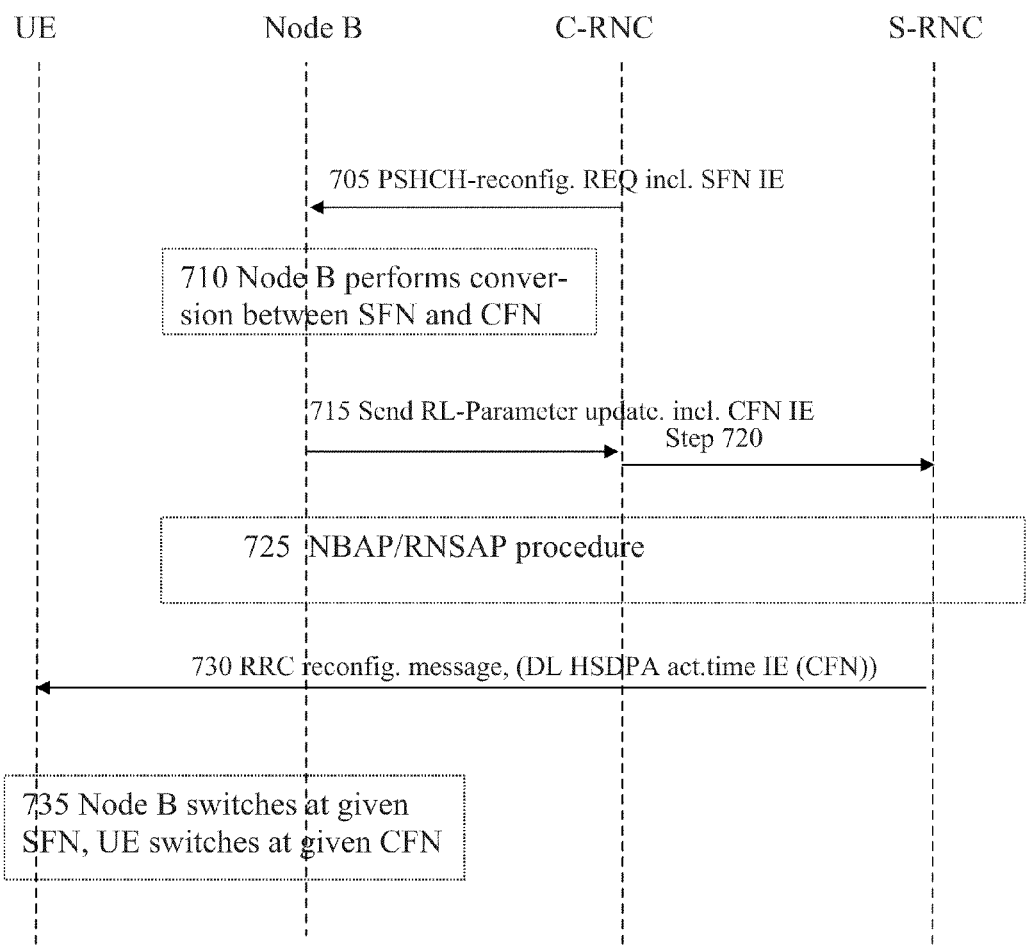
FIG. 7 shows a sequence chart illustrating the solution according to a third embodiment of the present invention.

FIG. 7 illustrates the third embodiment of this invention. In step 705, the C-RNC sends a PHYSICAL SHARED CHANNEL RECONFIGURATION REQUEST (PSHCH reconfig.REQ) message, including an SFN IE, to the Node B, and as indicated in box 710, the Node B converts the received SFN to a CFN, by determining the CFN from the received SFN, minimizing any performance degradation due to configuration discrepancy between the UE and the Node B, similarly as in the second embodiment. In step 715, the Node B sends a RADIO LINK PARAMETER UPDATE INDICATION (RL-parameter update) message, including the CFN IE, to the C-RNC, and in step 720, the C-RNC forwards the message to the S-RNC, in case the C-RNC and S-RNC are different nodes. Box 725 indicates an optional NBAP/RNSAP-reconfiguration procedure message to the Node B from the S-RNC, and in step 730, the S-RNC sends an RRC reconfiguration message, e.g. a PHYSICAL CHANNEL RECONFIGURATION, including a DL HSDPA activation time IE (CFN), to the UE, via Node B. Thereafter, as indicated in Box 735, the Node B switches at a given SFN, and the UE switches at a given CFN.

More specifically, upon receipt of a PHYSICAL SHARED CHANNEL RECONFIGURATION REQUEST message in step 705, including the SFN IE, the Node B derives the appropriate CFN, in box 710, to be included into the RADIO LINK PARAMETER UPDATE INDICATION message issued towards the C-RNC, in step 715-720. Upon receipt of a RADIO LINK PARAMETER UPDATE INDICATION message including the CFN IE, the S-RNC copies the CFN IE into the DL HSDPA activation time IE, to be included in the RRC reconfiguration message issued towards the UE, in step 725. Upon receipt of a reconfiguration message with the DL HSDPA activation time IE included, the UE activates the new configuration at the point of time defined by the DL HSDPA activation time IE, as indicated in box 735. Whereas the CFN IE is used towards the UE, the Node B activates the new dedicated configuration (related to the UE), as indicated in box 735, at the SFN previously indicated by the C-RNC in step 705. Consequently, and similarly to the solutions according to the first and second exemplary embodiments, it is possible for the Node B to determine the SFN where the switch to the new configuration shall take place by either the explicit indication of switching time or the implicit indication of switching time. Similarly to the solution according to the second exemplary embodiment, the RADIO LINK PARAMETER UPDATE INDICATION message, in step 715, is not issued by the Node B earlier than 255 frames before the point of time where the switch shall occur, i.e. the Node B may have to wait before issuing such message towards the S-RNC.

Figure 8:
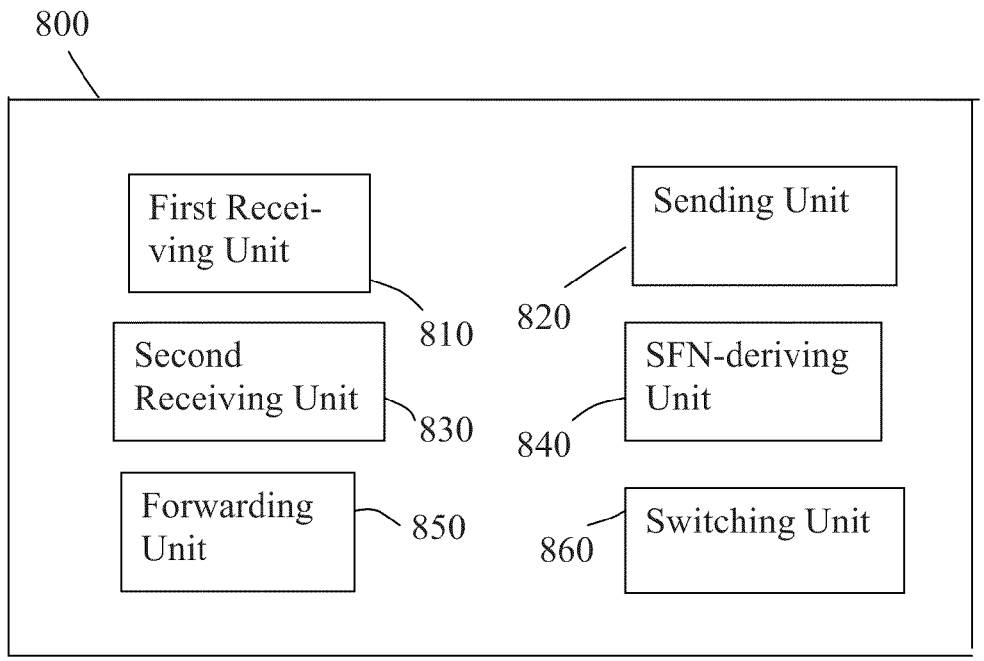
FIG. 8 is a block diagram illustrating the functional units of a Node B arranged to perform the method according to a first embodiment of this invention.

FIG. 8 is a block diagram, illustrating the functional units of a first exemplary embodiment of a Node B, 800, arranged to perform the method according to the first exemplary embodiment of this invention. The first receiving unit 810 receives a reconfiguration requesting message from the cell controlling unit, the sending unit 820 sends a radio link updating message to the UE controlling entity, the second receiving unit 830 receives a NBAP/RNSAP reconfiguration message from the S-RNC and the SFN-deriving unit 840 derives the SFN from a received NBAP/RNSAP reconfiguration message; the forwarding unit 850 forwards an RRC reconfiguration message to the UE, enabling the UE to switch to a new configuration at a switching time indicated by SFN, and the switching unit 860 in the Node B switches to a new configuration at the point of time indicated by SFN IE.

Figure 9:
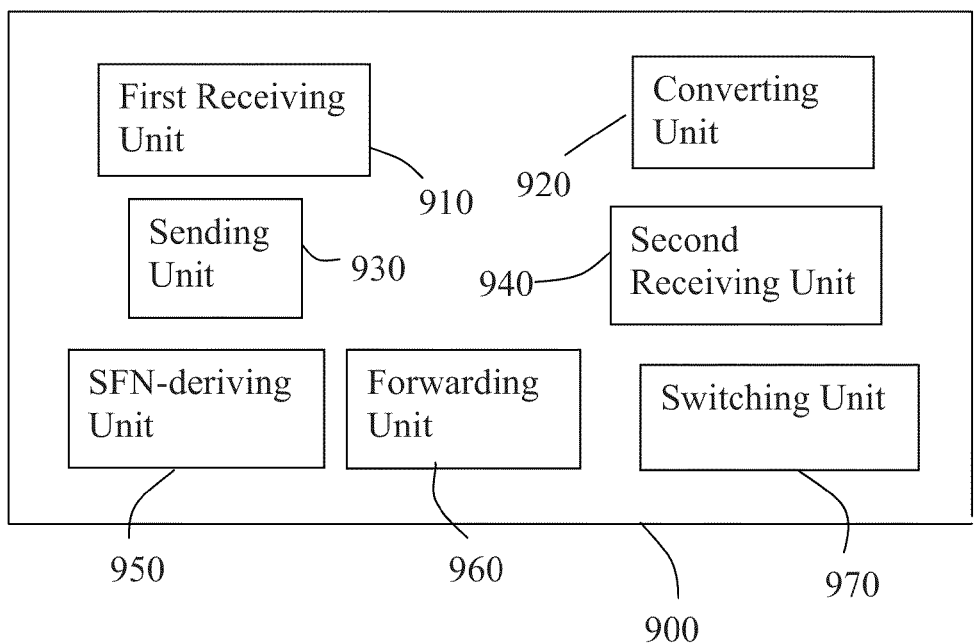
FIG. 9 is a block diagram illustrating the functional units of a Node B arranged to perform method according to the second and third embodiments of this invention.

FIG. 9 is a block diagram, illustrating the functional units of a second exemplary embodiment of a Node B, 900, arranged to perform the method according to the second and third embodiments of this invention. The first receiving unit 910 receives a reconfiguration requesting message from the cell controlling unit, the converting unit 920 converts the SFN to a CFN, the sending unit 930 sends a radio link updating message to the UE controlling entity, the second receiving unit 940 receives a NBAP/RNSAP reconfiguration message from the S-RNC and the SFN-deriving unit 950 derives the SFN from a received NBAP/RNSAP reconfiguration message; the forwarding unit 960 forwards an RRC configurating message to the UE, enabling the UE to switch to a new configuration at a given CFN, and the switching unit 970 in the Node B switches to a new configuration at the point of time indicated by SFN IE.

The invention has been described with reference to specific exemplary embodiments and figures only to illustrate the inventive concept, and the invention is not limited to the disclosed embodiments. Instead, the invention is intended to cover various modification within the scope of the appended claims.

The invention claimed is:

1. A method in a radio base station for performing a synchronized HSDPA (High Speed Downlink Packet Access)—related reconfiguration in a UTRAN (Universal Terrestrial Radio Access Network), characterised by the following steps:

receiving a reconfiguration requesting message from a cell controlling entity of a radio resource server, the message comprising an SFN (System Frame Number) IE (Information Element) indicating a configuration switching time;

performing a conversion of the SFN (System Frame Number) to a CFN (Connection Frame Number)

sending a Radio Link updating message to the UE (User Equipment) controlling entity of a radio resource server, the message comprising a first activation time IE indicating said CFN, said first activation time being a CFN IE receiving an NBAP/RNSAP (Node B Application Part/Radio Network Subsystem Application Part) reconfiguration message from the UE controlling entity;

deriving the SFN IE from said NBAP/RNSAP reconfiguration message;

forwarding an RRC (Radio Resource Control) reconfiguration message to the UE, the message received from said UE controlling entity and comprising a second activation time IE, enabling the UE to switch to a new configuration at the point of time indicated by CFN switching to a new configuration at the point of time indicated by the SFN IE.

2. The method according to claim 1, wherein the step of deriving the SFN IE from said NBAP/RNSAP reconfiguration message is performed by the additional steps of adding the SFN IE in the Radio Link updating message to the UE controlling entity;

reading the SFN IE copied into said NBAP/RNSAP reconfiguration message from the Radio Link updating message by the UE controlling entity.

3. The method according to claim 1, wherein the step of deriving the SFN IE from said NBAP/RNSAP reconfiguration message is performed by the additional steps of adding a binding information in the Radio Link updating message to the UE controlling entity;

determining the SFN IE from said binding information copied into the NBAP/RNSAP reconfiguration message from the Radio Link updating message by the UE controlling entity.

4. The method according to claim 1, wherein the said second activation time IE, enabling the UE to perform the reconfiguration at the point of time indicated by CFN, corresponds to a CFN IE.

5. The method according to claim 1, wherein said second activation time IE, enabling the UE to perform a reconfiguration at the point of time indicated by CFN, is a Downlink HSDPA (High Speed Downlink Packet Access) IE, providing an improved synchronization.

6. The method according to claim 5, wherein the Downlink HSDPA IE indicates the head boundary of a P-CCPH (Primary Common Control Physical Channel) frame.

7. The method according to claim 1, wherein the radio resource server corresponds to a radio network controller, RNC; the cell controlling entity corresponds to a controlling radio network controller, C-RNC; and the UE controlling entity corresponds to a serving radio network controller, S-RNC.

8. A radio base station in a UTRAN (Universal Terrestrial Radio Access Network), arranged to perform a synchronized HSDPA (High Speed Downlink Packet Access)-related reconfiguration, characterized in a first receiving unit for receiving a reconfiguration requesting message from a cell controlling entity of a radio resource server, the message comprising an SFN (System Frame Number) IE (Information Element), indicating a configuration switching time;
- a converting unit for performing a conversion of the SEW (System Frame Number) to a CFN (Connection Frame Number) a sending unit for sending a Radio Link updating message to the UE (User Equipment) controlling entity of a radio resource server, the message comprising a first activation time IE indicating said CFN, the first activation time IE corresponding to a CFN IE
- a second receiving unit for receiving an NBAP/RNSAP (Node B Application Part/Radio Network Subsystem Application Part) reconfiguration message from the UE controlling entity;
- an SFN-deriving unit for deriving said SFN IE from a NBAP/RNSAP reconfiguration message received from the UE controlling entity;
- a forwarding unit for forwarding an RRC (Radio Resource Control) reconfiguration message to the UE, the message received from said UE controlling entity and comprising a second activation time IE, enabling the UE to switch to a new configuration at the point of time indicated by CFN;
- a switching unit for switching to a new configuration at the point of time indicated by said SFN IE.

9. The radio base station according to claim 8, wherein said SFN deriving unit is arranged to derive the SFN IE by adding said SFN IE in the Radio Link updating message and reading the SFN IE copied into the NBAP/RNSAP reconfiguration message from the Radio Link updating message by the UE controlling entity.

10. The radio base station according to claim 8, wherein said SFN deriving unit is arranged to derive the SFN by adding a binding information in the Radio Link updating message and determining the SFN IE from said binding information, which is copied into the NBAP/RNSAP reconfiguration message from the Radio Link updating message by the UE controlling entity.

11. The radio base station according to claim 8, wherein said second activation time IE, enabling the UE to perform the reconfiguration at the point of time indicated by CFN, corresponds to a CFN IE.

12. The radio base station according to claim 8, wherein said second activation time IE, enabling the UE to perform a reconfiguration at the point of time indicated by CFN, is a Downlink HSDPA (High Speed Downlink Packet Access) IE, providing an improved synchronization.

13. The radio base station according to claim 12, wherein the Downlink HSDPA IE indicates the head boundary of a P-CCPCH (Primary Common Control Physical Channel) frame.

14. The radio base station according to claim 8, wherein the radio resource server corresponds to a radio network controller, RNC; the cell controlling entity corresponds to a controlling radio network controller, C-RNC; and the UE controlling entity corresponds to a serving radio network controller, SRNC.

* * * * *

UNITED STATES PATENT AND TRADEMARK OFFICE
CERTIFICATE OF CORRECTION

| | | |
|---|---|---|
| PATENT NO. | : 7,911,965 B2 | Page 1 of 1 |
| APPLICATION NO. | : 11/575746 | |
| DATED | : March 22, 2011 | |
| INVENTOR(S) | : Bergstrom et al. | |

It is certified that error appears in the above-identified patent and that said Letters Patent is hereby corrected as shown below:

In Column 13, Line 23, in Claim 8, delete "SEW" and insert -- SFN --, therefor.

Signed and Sealed this
Sixteenth Day of August, 2011

David J. Kappos
*Director of the United States Patent and Trademark Office*